(12) United States Patent
Apostolopoulos

(10) Patent No.: US 8,045,467 B2
(45) Date of Patent: Oct. 25, 2011

(54) REDUCING A NUMBER OF DATA PACKETS TO INCREASE A NUMBER OF ERROR CORRECTING PACKETS

(75) Inventor: John Apostolopoulos, Palo Alto, CA (US)

(73) Assignee: Hewlett-Packard Development Company, L. P., Houston, TX (US)

(*) Notice: Subject to any disclaimer, the term of this patent is extended or adjusted under 35 U.S.C. 154(b) by 776 days.

(21) Appl. No.: 11/494,930

(22) Filed: Jul. 28, 2006

(65) Prior Publication Data
US 2008/0025220 A1   Jan. 31, 2008

(51) Int. Cl.
*H04L 1/00* (2006.01)
(52) U.S. Cl. ......................... 370/235; 370/465
(58) Field of Classification Search .................. 370/235
See application file for complete search history.

(56) References Cited

U.S. PATENT DOCUMENTS

| 5,243,428 | A* | 9/1993 | Challapali et al. | 348/607 |
| 6,412,013 | B1* | 6/2002 | Parthasarathy et al. | 709/235 |
| 2001/0019589 | A1 | 9/2001 | Kim et al. | |
| 2005/0013249 | A1* | 1/2005 | Kong et al. | 370/235 |

FOREIGN PATENT DOCUMENTS
EP   1422892   5/2004

* cited by examiner

*Primary Examiner* — Jason Mattis
*Assistant Examiner* — Stephen J Clawson

(57) ABSTRACT

Data packet processing is described. A set of first data packets is accessed. A number of the first data packets are identified as candidate data packets to be potentially transmitted over a network to a receiver. The number of candidate data packets is then reduced so that a number of second data packets comprising error correction information for one or more of the first data packets can be increased.

20 Claims, 5 Drawing Sheets

REDUCING A NUMBER OF DATA PACKETS TO INCREASE A NUMBER OF ERROR CORRECTING PACKETS

TECHNICAL FIELD

Embodiments in accordance with the present invention relate to data processing and data delivery.

BACKGROUND ART

Media delivery over wired and wireless networks is continuing to grow in importance. A variety of techniques have been developed to increase the reliability of media delivery over a lossy packet network. These techniques include forward error correction (FEC), retransmission, error-resilient coding, and error concealment, as well as various combinations of these approaches.

A number of FEC-based strategies have been developed to increase the reliability of media delivery. In perhaps the most popular approach, sufficient FEC packets are added to the media stream so that a receiver (or client) can recover all transmitted data (media) packets if any of the media packets are lost in transit, as long as the total number of lost packets is less than a threshold. This approach treats all media packets equally and provides equal error protection across all packets. Such an approach can be referred to as a "protect all" approach to signify that all of the packets are protected.

Another FEC-based approach protects the more important data while the less important data is not protected. This approach can be referred to as a "protect subset" approach to signify that only a subset of the packets is protected while the remaining packets are not protected. For example, when the amount of packet loss is greater than the amount of protection that can be applied using the "protect all" approach, then the "protect subset" approach is used so that the redundancy is allocated to protect the more important data. For example, when media is encoded (compressed) using a Moving Pictures Experts Group (MPEG) compression scheme, media packets carrying data for I-frames are generally considered to be more important than media packets carrying data for P-frames or B-frames. Thus, for example, the available redundancy may be allocated to the media packets carrying data for the I-frames.

In the "protect subset" approach, the redundancy may be allocated equally to each of the more important media packets. A variant on that approach is to apply different levels of protection to different subsets of media packets. That is, the available redundancy is not allocated exclusively to the more important media packets, but instead is shared with media packets of lesser importance, with some media packets receiving a higher level of protection and other media packets a lower level of protection. Providing different levels of protection to different data is referred to as unequal error protection (UEP). In the MPEG example above, a greater proportion of the available redundancy can be allocated to protect media packets associated with I-frames and a lesser proportion to protect media packets associated with P-frames, while B-frames may not be protected (no redundancy applied). This approach can be referred to as a "protect different subsets with UEP" approach.

If there is sufficient bandwidth to accommodate the number of FEC packets necessary to overcome the expected packet loss, then the "protect all" approach is generally the best strategy to employ. However, in situations where there is not enough bandwidth available for FEC for the "protect all" approach to enable the recovery of all the lost packets, it is unclear which of the remaining strategies should be selected and implemented in order to decrease or even minimize the expected distortion of the reconstructed media at the receiver/client.

Accordingly, there is value to a data protection strategy that can be employed when a "protect all" approach is not a viable alternative.

DISCLOSURE OF THE INVENTION

Embodiments in accordance with the present invention pertain to the processing of data packets. In one embodiment, a set of first data packets is accessed. A number of the first data packets are identified as candidate data packets to be potentially transmitted over a network to a receiver. The number of candidate data packets is then reduced so that a number of second data packets comprising error correction information for one or more of the first data packets can be increased.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are generally applicable to different types of data. In particular, the descriptions and examples provided herein are applicable to media data (also referred to herein as multimedia data or media content). One example of media data is video data accompanied by audio data; for example, a movie with soundtrack. The video data may be compressed (encoded) using any of a variety of coding standards including, but not limited to, Moving Pictures Experts Group (MPEG) 1/2/4, MPEG-4 Advanced Video Coding (AVC), H.261/2/3/4, JPEG (Joint Photographic Experts Group), JPEG 2000 including Motion JPEG 2000, and 3-D subband coding. The media data may also consist of speech data, audio data, image data, or graphics data.

Figure 1:
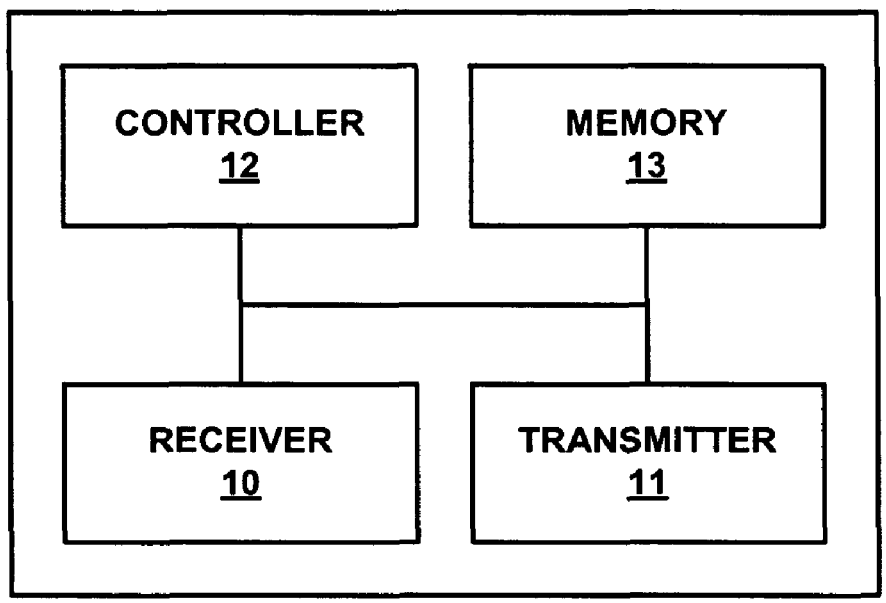
FIG. 1 is a block diagram showing elements of a system upon which embodiments of the present invention can be implemented.

FIG. 1 is a block diagram showing elements of a system upon which embodiments of the present invention can be implemented. In the example of FIG. 1, the system is implemented as device 100, which includes a transmitter 11, a controller 12 (e.g., a processor or microprocessor), and a memory 13. In one embodiment, device 100 also includes a receiver 10. Receiver 10 and transmitter 11 are capable of either wired or wireless communication. Receiver 10 can be used to receive, for example, information (feedback) that identifies the rate or probability of packet loss over a network, or over some portion of a network, to which device 100 is coupled.

Device 100 may process data (e.g., media data) that is or is not packetized. If not packetized, device 100 can packetize the data into data (media) packets.

In one embodiment, device 100 is implemented as a content source. In another embodiment, device 100 is implemented as a mid-network node, in which case device 100 (receiver 10) may receive data or data packets from an upstream node in the network.

Memory 13 can be used to store data and to accumulate data or data packets received by or packetized by device 100.

Figure 2:
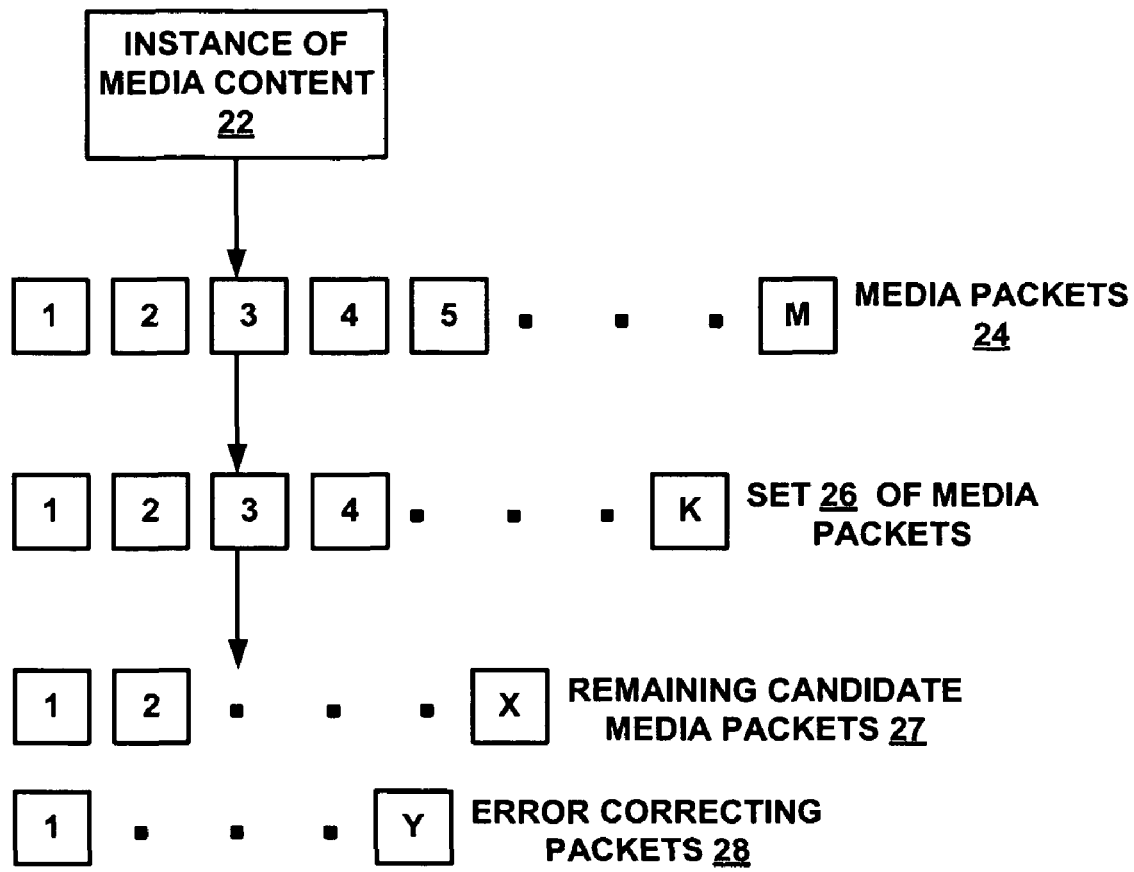
FIG. 2 is a data flow diagram showing data packets that are processed according to an embodiment of the present invention.

Data packets that are processed according to an embodiment of the present invention are represented in the data flow diagram of FIG. 2. In the example of FIG. 2, an instance of media content 22 is pre-encoded (compressed) and stored in memory 13. In one embodiment, the instance of media content 22 is packetized into M data (media) packets 24.

The instance of media content 22 may include an item such as a movie or a live event that has been captured and recorded, or a live event that is to be distributed in real time. One instance of media content may be differentiated from another. For example, a first instance of media content may have one title and a second instance of media content may have a different title.

There are other ways to differentiate between instances of media content. An instance of media content may be identified as such using the packet identifier code (PID) assigned when the content is encoded—the output of the encoder may be referred to as an elementary stream, and packets in the same elementary stream have the same packet identifier code PID. An instance of media content may be identified as such using an object descriptor (OD)—an instance of media content has its own OD identifier. The OD may point to a list of elementary stream descriptors that point to one or more streams with data or side information for the instance of media content. An instance of media content may be identified as such using an intellectual property identification (IPI) descriptor—an instance of media content has its own IPI descriptor. If multiple instances of media content are identified by the same IPI information, the IPI descriptor may consist of a pointer to another elementary stream or PID. An instance of media content may be identified by its own Uniform Resource Locator (URL). There may be other ways to distinguish one instance of media content from another.

In one embodiment, the media packets 24 are independently decodable from one another. Specifically, if a decoder (see FIG. 3) receives any single media packet, it can decode that packet to produce a useful signal (without requiring access to any of the other data packets). In some instances, the quality of the decoded signal may be improved as more media packets are accurately received. For example, as long as a decoder receives any one of the media packets 24, it can decode and reconstruct a useful version of a corresponding portion of the instance of media content 22. If the decoder receives two media packets, it can decode and reconstruct a relatively improved version of that portion. If all media packets are received, quality is at its highest. In some instances, the data needed to achieve the highest degree of quality can be included in a single media packet. In some instances, a large group of media packets may be required to be received before any decoding can be performed.

In one embodiment, an error correcting technique is applied to the media packets 24 in order to produce one or more data packets comprising error correction (EC) information. In one embodiment, a forward error correction (FEC) technique is used; such techniques are known in the art.

The term "data packet" may be used herein to refer to either data packets that include data (e.g., media data) or data packets that contain EC information. For simplicity of discussion, to distinguish a data packet containing data (e.g., media data) from one containing EC information, the term "media packet" or "first data packet" may be used to refer to data packets that include media data, and the term "EC packet" or "second data packet" may be used to refer to data packets that include error correction information.

As will be seen from the discussion below, according to embodiments of the present invention, the number of media packets and the number of EC packets is iteratively changed to improve and perhaps maximize media quality (or conversely, reduce or perhaps minimize the amount of distortion) at a receiving (client) device. More specifically, according to embodiments of the present invention, one or more media packets can be purposely and preemptively "discarded" when it is beneficial to do so, so that more EC packets can be transmitted in their stead. In other words, in instances in which bandwidth constraints or other considerations limit the number of data packets that can be sent per unit of time, one or media data packets may be "discarded" to make room for a like number of additional EC packets.

Although media data packets are described as being "discarded," they may not be actually discarded in the sense that they may still exist in memory 13. However, they are discarded in the sense that, although they were identified as candidates that could be sent to the receiving device during a certain period of time, they are discarded (removed) from the output stream and they are not sent to the receiving device, at least not during the scheduled time period.

Figure 3:
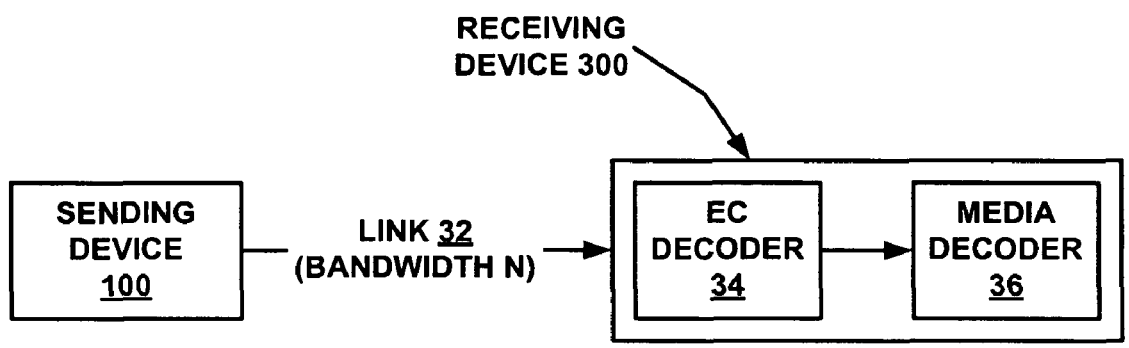
FIG. 3 is a block diagram showing a transmitting device in communication with a receiving device according to an embodiment of the present invention.

FIG. 3 is a block diagram showing device 100 in wired or wireless communication with a receiving (client) device 300 via a link 32. The link 32 represents what may be a direct link between the devices 100 and 300, or what may be an indirect link in which there are one or more other network devices situated on the communication path between devices 100 and 300.

In the example of FIG. 2, the instance of media content 22 is encoded for a transmission rate of K packets per unit time. In the example of FIG. 3, link 32 has a throughput of N packets per unit time, where N may be less than, equal to, or greater than K. The throughput of link 32 may also be referred to herein as its bandwidth or as the governing or limiting data packet transmission rate. In a case in which link 32 represents an indirect link and thus traverses intervening network devices as well as the links between those intervening devices, the governing data packet transmission rate may be set by any one of the devices or links that constitute link 32.

During transmission over link 32, packets may be lost at the rate of P packets per unit time. The packet loss rate may be a constant value, or it may vary with time. The packet loss rate may be derived in a number of different ways. For example, it can be estimated using historical information or it can be measured in real time. Also, receiving device 300 can provide feedback about the number of data packets it has received, and device 100 can derive a packet loss rate based on that feedback.

In one embodiment, receiving device 300 decodes one time unit's worth of data packets at a time (e.g., with a bandwidth of N, a block of N data packets are received per unit of time, and N data packets are decoded at a time). In one embodiment, receiving device 300 includes an EC decoder 34 followed by a media decoder 36. Depending on the amount of packet loss and the degree of error protection, some data packets lost during transmission may not be recoverable by the EC decoder 34 and are thus unavailable to the media decoder 36. The quality of the reconstructed media is determined at least in part by the data packets that are received, EC-decoded and available to the media decoder 36. The distortion introduced into the reconstructed media by the unavailability of a media packet 'i' can be expressed as $D(i)$.

With reference to both FIGS. 2 and 3, if the coding rate K is less than the transmission rate N, then there are N minus K (N−K) data packets that can be used as EC packets. If N−K EC packets provide a sufficient or desired level of redundancy for the K media packets, then the "protect all" approach described previously herein can be utilized. However, if N−K is not large enough to provide a desired level of protection, or if K is equal to or greater than N, then embodiments in accordance with the present invention are advantageous relative to conventional approaches.

According to embodiments of the present invention, media packets 24, or a subset of those media packets, are accessed (read or retrieved) from memory 13 for processing. In general, a set 26 of K media packets are accessed at a time for processing. Device 100 processes one time unit's worth of data packets at a time (e.g., with a coding rate of K, a set of K data packets are processed per unit of time).

The set 26 of K media packets can be referred to as candidate media packets that may be transmitted to receiving device 300. Using the packet loss rate P as a guide, device 100 can determine a number Y of EC packets that provide sufficient protection for the set 26 of candidate media packets. If the number Y of EC packets is less than or equal to N−K, then the "protect all" approach may be used. If the number Y of EC packets is greater than N−K, then the number of candidate media packets is reduced to accommodate the number Y of EC packets. The number of candidate media packets can continue to be reduced until, given the packet loss rate P, there is a sufficient number Y of EC packets 28 to protect the remaining number X of candidate media packets 27, where X plus Y (X+Y) does not exceed the governing packet transmission rate N. For simplicity of discussion, the number X of candidate media packets 27 may be referred to herein as the "first number," and the number Y of EC packets 28 may be referred to herein as the "second number."

Note that, even if there is generally sufficient room for the "protect all" approach, it may still be useful to conservatively reduce the number of candidate media packets to allow additional room for EC packets, because packet loss is a probabilistic event and the number of lost packets may vary significantly from the packet loss rate P. For example, the packet loss rate may average five percent, but at times it may be four percent and at other times six percent, and so it may be useful to include additional EC packets to cover any potential increase over the assumed packet loss rate.

The media packets 24, or the media packets in each set 26 of K media packets, can be ranked according to some measure of relative importance. The ranking can be used to determine which of the candidate media packets should be removed (discarded), in order to reduce them in number and provide additional room for protection packets. If the media packets are ranked, then media packets of lesser importance can be removed before media packets of greater importance.

Different criterion can be used to rank the media packets 24 or a subset thereof. For example, when media is encoded using MPEG, media packets carrying data for I-frames are generally considered to be more important than media packets carrying data for P-frames, which in turn are generally considered to be more important than media packets carrying data for B-frames. Thus, media packets associated with I-frames can be assigned the highest rank, media packets associated with P-frames can be assigned the next highest rank, and media packets associated with B-frames can be assigned the lowest rank. Similar ranking in terms of importance can be used for various types of scalable coding including scalable image, video, speech, audio, and graphics coding. These scalable coders typically produce a natural ordering of the coded media data that can be used to rank the media packets 24 or a subset thereof. More complex ranking schemes can be utilized, so that each media packet is assigned a unique place in the ranking.

In one embodiment, the effect associated with not sending a media packet is determined for each of the media packets 24 or subsets thereof. In one such embodiment, an amount of distortion $D(i)$ that would be introduced into the reconstructed media by the unavailability of a media packet 'i' is used to rank the media packets in each set 26 of K media packets. In such an embodiment, for example, the candidate media packet with the lowest $D(i)$ may be removed from the set 26 in order to make room for an additional EC packet to be added. If the addition of one EC packet is not sufficient to protect the media packets remaining in the set 26, then the candidate media packet with the next lowest $D(i)$ may be removed from the set so that another EC packet can be added, and so on, until there is a sufficient number of EC packets to protect the number of media packets remaining in set 26.

Alternatively, media packets can be removed from set 26 in order of increasing $D(i)$, and a corresponding number of EC packets added, until the expected distortion satisfies a criterion or threshold. For example, this search may be performed in order to minimize the expected distortion at the receiving device 300 based on the $D(i)$'s associated with the packets in set 26. Note that, with K media packets ordered by increasing $D(i)$, there are only K options to examine: namely, remove zero media packets, remove one media packet, remove two media packets, . . . , or remove K−1 media packets.

Alternatively, different subsets of the media packets may be considered for discarding from the set 26. For instance, the subsets may be pairs of packets or triplets of packets or, more generally, any subset of the packets. The importance of each of these subsets can be quantified by its associated distortion (e.g., the sum of the $D(i)$'s of the packets in each of the subsets), and then the subsets themselves can be ordered in terms of importance.

Note that the importance of a packet or a subset may be either an absolute importance (as measured, for example, by mean-square error distortion or a perceptual distortion) or a relative distortion.

The error correction technique being utilized to add redundancy may or may not be applied to all of the remaining candidate media packets, and may or may not be applied equally to all of the remaining candidate data packets. That is, as explained above, there will be X candidate media packets 28 remaining after some of them may have been removed to allow for additional EC packets. In one embodiment, the available redundancy is applied equally to all of the remaining candidate media packets 28. In another embodiment, a subset of the remaining candidate media packets 28 is identified, and the available redundancy is applied only to the media packets in that subset. In another embodiment, different subsets of the remaining media packets 28 are identified, and the available redundancy is applied unequally to the various subsets of media packets—that is, one subset may be allocated more of the available redundancy than another to provide a higher level of protection to one subset than the other. The decision as to which media packets are to be protected, and to what degree, can be based on the relative importance of the media packets, for example.

Consider an example in which the coding rate K is eight and the available bandwidth N is nine, meaning that there is only room for one EC packet (N−K is one), unless the number of media packets is reduced. In this example, in order to achieve a satisfactory level of redundancy, two of the candidate media packets are removed, such that the remaining number X of candidate media packets is six, and the number Y of EC packets is three. In one embodiment, the three EC packets are used to protect all six of the remaining media packets equally. In another embodiment, the three EC packets may be used to protect the remaining media packets unequally. For example, only a subset of the six candidate media data packets (e.g., only the most important four of the candidate media packets) may be protected. Alternatively, two of the EC packets may be allocated to a first subset of the most important candidate media packets, while the other EC packet may be allocated to a second subset of the less important candidate media packets (e.g., two EC packets may be allocated to the most important three of the candidate media packets, and one EC packet may be allocated to the other three candidate media packets).

Figure 4:
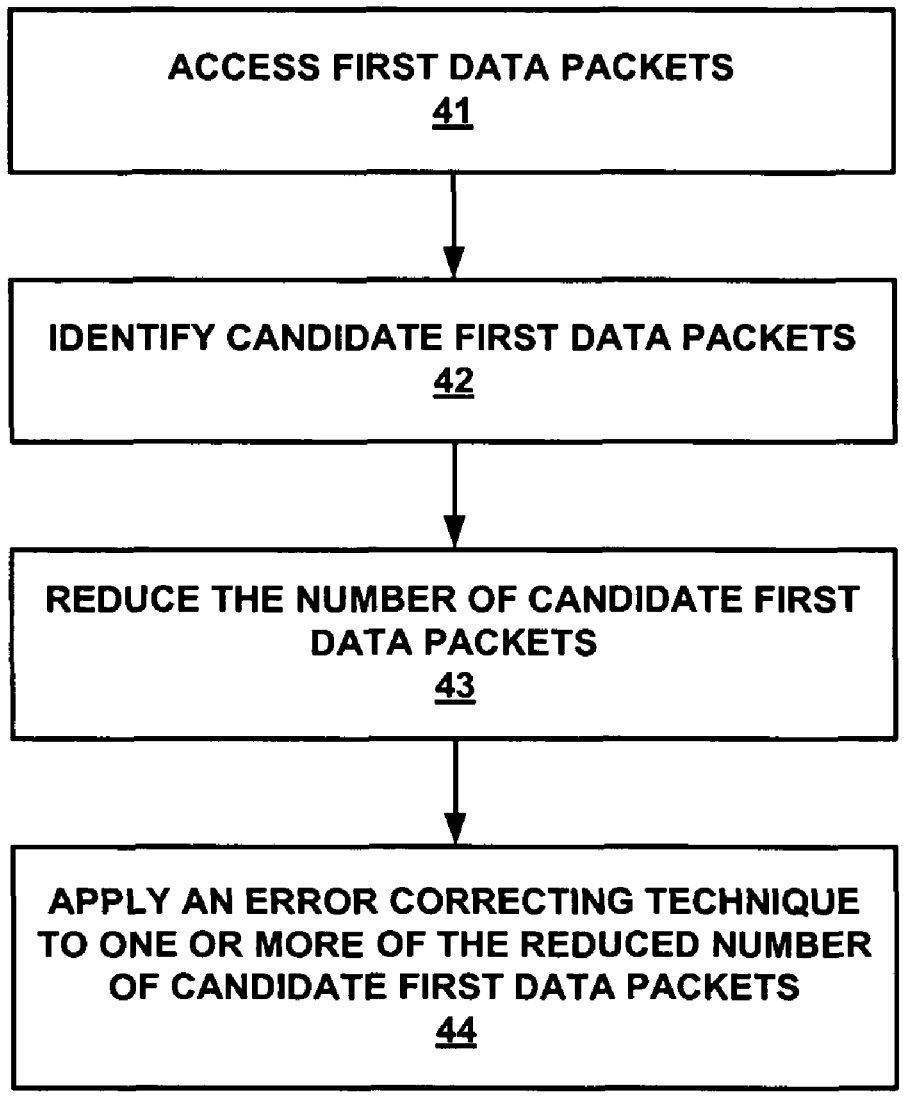
FIG. 4 is a flowchart of a method for processing data packets in accordance with an embodiment of the present invention.

FIG. 4 is a flowchart 400 of a method for processing data packets in accordance with an embodiment of the present invention. Although specific steps are disclosed in flowchart 400, such steps are exemplary. That is, embodiments of the present invention are well-suited to performing various other steps or variations of the steps recited in flowchart 400. The steps in flowchart 400 may be performed in an order different than presented, and not all of the steps in flowchart 400 may be performed. All of, or a portion of, the methods described by flowchart 400 may be implemented using computer-readable and computer-executable instructions which reside, for example, in computer-usable media of a computer system. In one embodiment, flowchart 400 is performed by device 100 of FIG. 1.

In block 41 of FIG. 4, first data packets are accessed in memory. In one embodiment, the first data packets include media data.

In block 42, a first number of the first data packets are identified as candidate data packets to be potentially transmitted to a receiver over a given period of time.

In block 43, the first number of candidate data packets is reduced so that a second number of second data packets can be increased by a corresponding amount. That is, if the first number is reduced by one, the second number is increased by one. The first number plus the second number is not greater than a governing data packet transmission rate. The second data packets are intended as error correction packets that will include error correction information for all or a portion of the candidate data packets.

In one embodiment, the first data packets are ranked according to a measure of relative importance. In such an embodiment, the ranking is used to select which candidate data packets to remove in order to reduce the first number. In another such embodiment, an effect (e.g., the amount of distortion) associated with not sending a first data packet is quantified, and the quantified effect is used to rank the candidate data packets. The information corresponding to the ranking of each media packet may be contained in the media packet (e.g., in the packet header of each packet), or in a file associated with the media (e.g., in a hint track that provides "hint" information for each packet in the media track), or the information may be computed or estimated from the media packet contents themselves. The information describing the importance of each packet may also be provided by a variety of other means.

In yet another embodiment, an effect (e.g., the total amount of distortion) associated with not sending different numbers of the first data packets is quantified. In such an embodiment, values for the first and second numbers are selected such that the effect satisfies a threshold. For example, first data packets can be removed one by one, and EC packets added one by one, until the net effect on quality or distortion satisfies a criterion or threshold.

In block 44, as selected first data packets are removed from the set of candidate data packets, an error correcting technique is applied to one or more, and up to all, of the first data packets remaining in the set until there are enough of the second data packets to compensate for a data packet loss rate.

In one embodiment, the error correcting technique is applied to all of the first data packets (candidate data packets) remaining in the set. In another embodiment, a subset of the first (candidate) data packets is selected. The error correcting technique is applied to first data packets included in the subset to generate the second number of second data packets.

In yet another embodiment, a first subset and a second subset of the first (candidate) data packets are selected. In one such embodiment, data packets included in the first subset are not included in the second subset, and vice versa. The error correcting technique is applied to first data packets included in the first subset to generate a first portion of the second number of second data packets, and is also applied to first data packets included in the second subset to generate a second portion of the second number of second data packets.

In one embodiment, the X media packets to be transmitted may be directly transmitted to the receiver along with Y EC packets. This is sometimes referred to as a systematic error correction code because the original X media packets directly appear in the X+Y transmitted packets. In another embodiment, the X media packets may be transformed to produce a total of X+Y packets that are transmitted. In this case, the transmitted packets are a function of the X media packets, but they are not exactly those packets. There are a variety of error correction techniques that take X input packets and produce X+Y packets for transmission to the receiver. Example error correction techniques include, but are not limited to, parity schemes, Hamming coding, BCH (Bose, Ray-Chaudhuri, Hocquenghem) codes, Golay codes, Reed-Solomon codes, convolutional codes, Turbo codes, erasure codes, and fountain codes.

Figure 5:
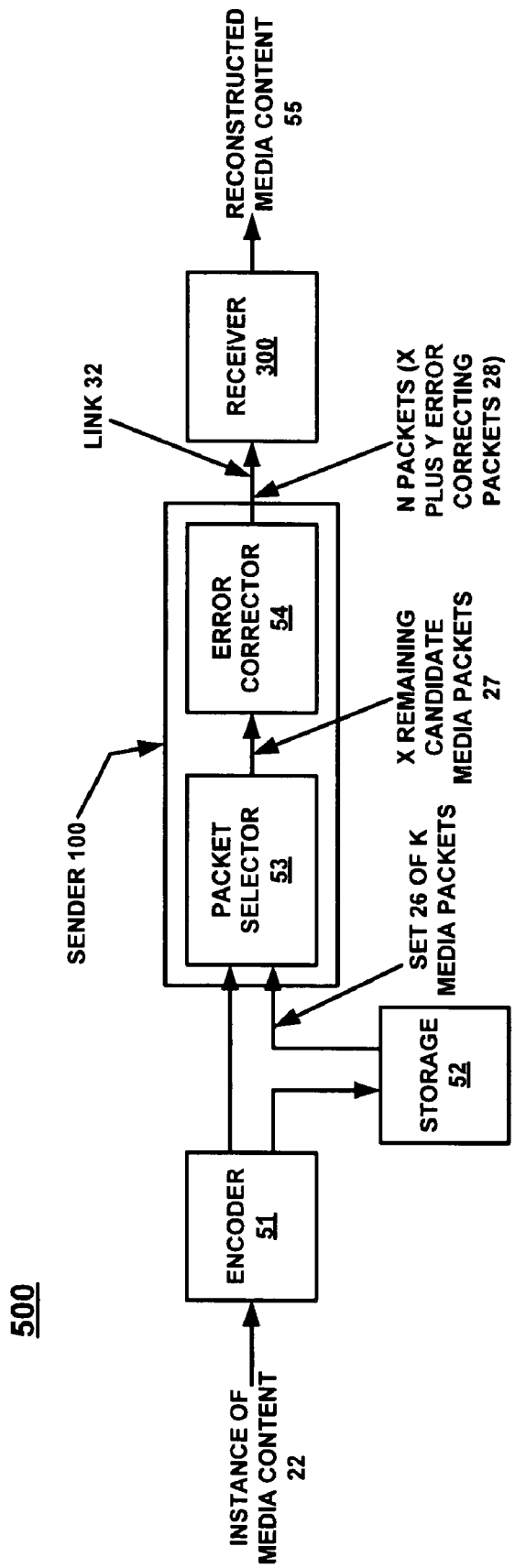
FIG. 5 is a block diagram showing elements of a media delivery system according to an embodiment of the present invention.

FIG. 5 is a block diagram showing elements of a media delivery system 500 according to an embodiment of the present invention. In the example of FIG. 5, an instance of media content 22 is encoded by encoder 51 for a transmission rate of K packets per unit time. The encoded media data is optionally stored in storage 52 for later transmission, which may reside on encoder 51 or on sender 100, or which may be a separate element. Alternatively, the encoded media data is sent directly to sender 100 for delivery. A set 26 of K media packets (e.g., candidate media packets) are accessed at a time for processing. Using, for example, a packet loss rate as a guide, sender 100 can determine a number Y of EC packets that is sufficient for protecting the set 26 of media packets. For a transmission rate N, if N–K is greater than Y, then a "protect all" approach may be used. Otherwise, the number of candidate media packets is reduced to allow more room for EC packets. Note that, even if there is generally sufficient room for the "protect all" approach, it may still be useful to conservatively reduce the number of candidate media packets to allow additional room for EC packets, because packet loss is a probabilistic event and the number of lost packets may vary significantly from the assumed packet loss rate.

Using information about the relative importance of each media packet, for example, packet selector 53 selects the subset of candidate media packets to transmit; these are identified as a number X of remaining candidate media packets 27. Error corrector 54 generates error correction information for the remaining candidate media packets 27. The error correction information is included in the number Y of EC packets 28. The output of sender 100 is N packets per unit time, where the N packets include a number X of remaining candidate data packets and a number Y of EC packets.

In summary, embodiments in accordance with the present invention provide a data protection strategy that can be employed when a "protect all" approach is not a viable alternative. According to these embodiments, a subset of data (e.g., media data) is protected by first "discarding" another subset of the data. The subset of data to send and protect can be selected based on knowledge of the relative importance of the media packets, which in turn may be based on the impact of each media packet on the quality of the delivered media. More specifically, the number of media packets to be transmitted is reduced to make room for additional error correction packets, providing increased protection for the portion of the data that is considered to be more important. While it may appear counterintuitive to intentionally introduce data packet losses into media delivery, by appropriately selecting which media packets to remove from the output stream and which media packets to send and protect, the quality of the delivered media can be maintained or increased. In particular, by explicitly removing data from transmission, additional room for error correction is gained, which is then used to provide improved protection for the more important remaining data.

Embodiments in accordance with the present invention are useful for data that is pre-encoded and stored (e.g., video on demand), as well as for data that is being encoded in real time. Embodiments in accordance with the present invention are particularly useful when the data is pre-encoded and stored, because in such a situation the data may be encoded for a given packet delivery rate, and it may not be possible for the transmitting device to re-encode the data at a different packet delivery rate in order to satisfy a bandwidth constraint or to provide the necessary room for a sufficient number of error correction packets to be sent.

Although the discussion herein used media data as an example, as mentioned above, embodiments in accordance with the present invention are generally applicable to different types of data.

Embodiments of the present invention are thus described. While the present invention has been described in particular embodiments, it should be appreciated that the present invention should not be construed as limited by such embodiments, but rather construed according to the following claims.

What is claimed is:

1. A method of processing data packets, said method comprising:
   accessing a plurality of first data packets comprising data;
   identifying a first number of said first data packets as candidate data packets to be potentially transmitted to a receiver over a link during a period of time, said link having a bandwidth;
   applying an error correcting technique to at least one of said first data packets to produce second data packets comprising error correction information; and
   iteratively reducing said first number of candidate data packets so that a second number of said second data packets for selected said candidate data packets is increased and reapplying said error correcting technique to remaining said first number of candidate data packets until said first number times an amount of bandwidth needed to transmit a first data packet plus said second number times an amount of bandwidth needed to transmit a second data packet is not greater than said bandwidth, wherein candidate data packets removed in order to reduce said first number are not sent to said receiver during said period of time, and wherein said second data packets are sent to said receiver during said period of time.

2. The method of claim 1 further comprising:
   discarding candidate data packets in order to reduce said first number; and
   increasing said second number by a corresponding amount, wherein said discarding and increasing are performed until there are enough of said second data packets to compensate for a data packet loss rate.

3. The method of claim 1 further comprising:
   ranking said first data packets according to a measure of relative importance; and
   using results of said ranking to select candidate data packets to remove in order to reduce said first number.

4. The method of claim 3 further comprising:
   quantifying an effect associated with not sending a first data packet; and
   using results of said quantifying for said ranking.

5. The method of claim 1 further comprising:
   quantifying an effect associated with not sending different numbers of said first data packets; and
   selecting values for said first and second numbers such that said effect satisfies a criterion.

6. The method of claim 5 wherein said effect comprises an amount of distortion that would be introduced into reconstructed said data, wherein said criterion is satisfied when said amount of distortion is minimized for said plurality of first data packets.

7. The method of claim 1 wherein values for said first and second numbers are selected such that there are enough second data packets to protect all selected said candidate packets.

8. The method of claim 1 further comprising:
   selecting a subset of said first data packets; and
   applying an error correcting technique to first data packets included in said subset to generate said second number of second data packets.

9. The method of claim 1 further comprising:
   selecting a first subset and a second subset of said first data packets;
   applying an error correcting technique to first data packets included in said first subset to generate a first portion of said second number of second data packets; and applying said error correcting technique to first data packets included in said second subset to generate a second portion of said second number of second data packets.

10. A non-transitory computer-usable medium having computer-readable code stored thereon for causing a device to perform a method of processing data packets, said method comprising:
accessing a set of first data packets comprising data to be potentially included in an output stream for transmission over a link during a period of time, said link having a bandwidth;
applying an error correcting technique to one or more first data packets in said set to produce second data packets comprising error correction information; and
iteratively removing selected first data packets from said set and reapplying said error correcting technique to one or more first data packets remaining in said set until a number of first data packets times an amount of bandwidth needed to transmit a first data packet in said set plus a number of said second data packets times an amount of bandwidth needed to transmit a second data packet is less than or equal to a specified limit corresponding to said bandwidth, wherein said selected first data packets are not included in said output stream, and wherein said second data packets are included in said output stream.

11. The non-transitory computer-usable medium of claim 10 wherein said method further comprises:
discarding said selected first data packets from said set to reduce said number of first data packets by an amount; and
increasing said number of second data packets by said amount, wherein said discarding and increasing are performed until there are enough of said second data packets to compensate for a data packet loss rate.

12. The non-transitory computer-usable medium of claim 10 wherein said method further comprises:
ranking first data packets in said set according to a measure of relative importance; and
using results of said ranking to identify said selected first data packets removed from said set.

13. The non-transitory computer-usable medium of claim 10 wherein said method further comprises:
quantifying an effect associated with including different numbers of said first data packets in said output stream; and
selecting values for said first and second numbers such that said effect satisfies a threshold.

14. The non-transitory computer-usable medium of claim 10 wherein said method further comprises:
selecting a subset of first data packets from said set; and
applying said error correcting technique to first data packets included in said subset to generate said second number of second data packets.

15. The non-transitory computer-usable medium of claim 10 wherein said method further comprises:
selecting a first subset of first data packets from said set and a second subset of other first data packets from said set;
applying said error correcting technique to first data packets included in said first subset to generate a first portion of said second number of second data packets; and
applying said error correcting technique to first data packets included in said second subset to generate a second portion of said second number of second data packets.

16. A device for processing data packets, said device comprising:
a transmitter operable for transmitting data over a link between said device and a receiving device, said link having a bandwidth;
a memory coupled to said transmitter and operable for storing a plurality of first data packets comprising said data; and
a processor coupled to said memory and operable for processing said first data packets, said processing comprising selecting a first number of said first data packets as candidate data packets to be potentially transmitted via said link and then iteratively reducing said first number of said first data packets so that a second number of second data packets comprising error correction information for selected said candidate data packets can be increased, said processor also for reapplying said error correcting technique to remaining said first data packets until said first number of said first data packets times an amount of bandwidth needed to transmit a first data packet plus said second number of said second data packets times an amount of bandwidth needed to transmit a second data packet is not greater than a limit corresponding to said bandwidth;
wherein candidate data packets that are removed by said reducing are not transmitted via said link and wherein said second data packets are transmitted via said link.

17. The device of claim 16 wherein said reducing comprises:
quantifying an effect associated with not sending a first data packet;
using results of said quantifying to rank said first data packets; and
using said rank to identify which of said candidate data packets are to be removed by said reducing.

18. The device of claim 16 wherein said processing further comprises quantifying an effect associated with not transmitting different numbers of said first data packets and selecting values for said first number of said first data packets and said second number of said second data packets such that said effect satisfies a criterion.

19. The device of claim 16 wherein said processing further comprises selecting a subset from said first number of first data packets and applying an error correcting technique to first data packets included in said subset to generate said second number of second data packets.

20. The device of claim 16 wherein said processing further comprises selecting a first subset and a second subset from said first number of first data packets, applying an error correcting technique to first data packets included in said first subset to generate a first portion of said second number of second data packets, and applying said error correcting technique to first data packets included in said second subset to generate a second portion of said second number of second data packets.

* * * * *